(12) United States Patent
Kossowsky (10) Patent No.: US 8,764,045 B1
(45) Date of Patent: Jul. 1, 2014

(54) SYSTEM AND METHOD FOR TRANSPORTING OBJECTS

(76) Inventor: Andy Kossowsky, Irvington, NY (US)

( * ) Notice: Subject to any disclaimer, the term of this patent is extended or adjusted under 35 U.S.C. 154(b) by 56 days.

(21) Appl. No.: 13/410,191

(22) Filed: Mar. 1, 2012

Related U.S. Application Data

(60) Provisional application No. 61/449,360, filed on Mar. 4, 2011.

(51) Int. Cl.
*B62B 3/02* (2006.01)

(52) U.S. Cl.
USPC ............. 280/651; 280/47.18; 280/47.35; 280/767

(58) Field of Classification Search
USPC ........... 280/651, 659, 47.18, 47.19, 47.29, 280/47.35, 47.2, 47.27, 47.28, 767; 211/2, 211/133.5, 134, 153, 187, 181.1
See application file for complete search history.

(56) References Cited

U.S. PATENT DOCUMENTS

| | | | | |
|---|---|---|---|---|
| 3,007,708 A * | 11/1961 | Ochs | ................ | 280/33.998 |
| 3,162,462 A * | 12/1964 | Elders | ................ | 280/47.35 |
| 3,191,956 A * | 6/1965 | Rizzuto | ................ | 280/641 |
| 3,240,507 A * | 3/1966 | Braun | ................ | 280/47.35 |
| 3,774,929 A * | 11/1973 | Stanley | ................ | 280/641 |
| 3,861,695 A * | 1/1975 | Shourek et al. | ................ | 280/5.24 |
| D286,218 S * | 10/1986 | Friedman | ................ | D34/17 |
| 4,765,646 A * | 8/1988 | Cheng | ................ | 280/651 |
| D343,040 S * | 1/1994 | Wilson | ................ | D34/19 |
| 5,294,158 A * | 3/1994 | Cheng | ................ | 280/641 |
| D409,811 S * | 5/1999 | Hutchinson | ................ | D34/21 |
| 6,497,331 B1 * | 12/2002 | Morandi | ................ | 211/153 |
| 6,540,239 B2 * | 4/2003 | Lee, Jr. | ................ | 280/33.993 |
| 6,663,139 B1 * | 12/2003 | Smith | ................ | 280/651 |
| 6,851,685 B2 * | 2/2005 | Koenig | ................ | 280/47.27 |
| 7,229,085 B2 * | 6/2007 | Pederson et al. | ................ | 280/79.3 |
| 7,246,805 B2 * | 7/2007 | Neal et al. | ................ | 280/35 |
| 7,246,814 B2 * | 7/2007 | Prather et al. | ................ | 280/651 |
| 7,278,645 B1 * | 10/2007 | Davis | ................ | 280/47.28 |
| 7,611,020 B2 * | 11/2009 | Prest | ................ | 211/195 |
| 2010/0133769 A1 * | 6/2010 | Wu | ................ | 280/47.18 |
| 2010/0140890 A1 * | 6/2010 | Boivin et al. | ................ | 280/47.34 |

* cited by examiner

*Primary Examiner* — J. Allen Shriver, II
*Assistant Examiner* — Steve Clemmons
(74) *Attorney, Agent, or Firm* — Andrew Vicknair (57) ABSTRACT

A method and adjustable and multi-use cart system are disclosed for moving objects. A user can utilize the present invention as a simple cart, a dolly, or even as a full size hand cart to move a variety of objects of various sizes.

18 Claims, 9 Drawing Sheets

SYSTEM AND METHOD FOR TRANSPORTING OBJECTS

CROSS REFERENCE TO RELATED APPLICATIONS

This application claims the benefit of U.S. provisional application Ser. No. 61/449,360 filed on Mar. 4, 2011.

TECHNICAL FIELD OF INVENTION

The present invention relates, in general to a system and method for transporting objects of various sizes in everyday activities, such as shopping, walking around town, and the like.

BACKGROUND OF INVENTION

Everyday life often entails individuals walking from one location to another and many times these individuals are transporting or will eventually need to transport objects of various sizes while traveling from one location to another. For example, individuals walking back and forth to retail facilities, such as supermarkets and shopping malls, often leave those locations with items that have to be transported back to the individual's place of origin, such as an apartment, house, or work. Individuals can carry items back from the retail facility in bags in their arms or simply in their arms; but often on longer routes, it is extremely inconvenient, tiresome, and sometimes dangerous for an individual to walk carrying these objects without any assistance. Thus, individuals will often utilize some type of cart to assist in transporting objects.

While carts do exist for assisting individuals in carrying objects, these carts are burdensome and sometimes limit a user's ability to retrieve items at the bottom of the cart and often limit the user's ability to easily stack items for ease of selection by a user. In addition, there are no carts that allow for the ease of removal of objects placed within the carts, especially items placed at the bottom of a cart. Likewise, there are no carts that specifically allow for ease of placement of object in a cart and at different levels within the cart. Ease of removal and ease of insertion is needed to assist users while utilizing a cart. In addition, there are currently no carts existing that give a user the ability to alter the size of the cart or modify the cart so that the cart may be used to operate as a hand cart and/or truck.

While items, such as carts, exist to assist individuals in transporting items from one location to another, such carts do not allow users to easily load items into or retrieve items from the bottom of carts. Further, carts do not currently allow users to utilize carts as a dolly to assist in transporting heavier items from one location to another. Accordingly, a need exists in the art for a system and method that allows individuals to easily load items into and retrieve items from the bottom sections of a cart and for a cart that is multifunctional in that it can be altered to function as a dolly as well as a cart.

BRIEF SUMMARY OF THE INVENTION

The present invention is a system and method for transporting objects of various sizes in everyday activities, such as shopping, walking around town, and the like. In particular, the present invention comprises a cart that is configured so that it may act as both a cart and dolly. In one embodiment, the cart may be modified by a user in that a user may be able to adjust the size of the cart and may be able to modify the cart by rearranging various members of the cart and adding members to the cart so that the cart may function as a hand truck for transporting any number of items, such as items that may not fit within the boundaries of the cart until the cart is modified and/or rearranged by its user. Thus, a user may transport items that fit within the boundaries of the cart, but a portion of the cart can be moved so that the boundaries are enlarged and a specialized dolly assembly can be activated so that a user may utilize the cart as a dolly for transporting a variety of objects, including objects that may be oversized and unable to fit within the boundaries of the cart.

In one embodiment of the present invention, a number of shelves may be installed by a user at the user's choosing, to enable a user to stack and separate items on the various shelves that may be installed. The present invention may also include a front door that can be opened so that the entire interior of the cart is exposed so that a user may easily retrieve items located at any location within the cart.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 1A is an illustration of the underside of the present invention illustrated in FIG. 1.

DETAILED DESCRIPTION OF THE INVENTION

Referring now in more detail to the drawings, the present invention will now be described in more detail.

Figure 1:
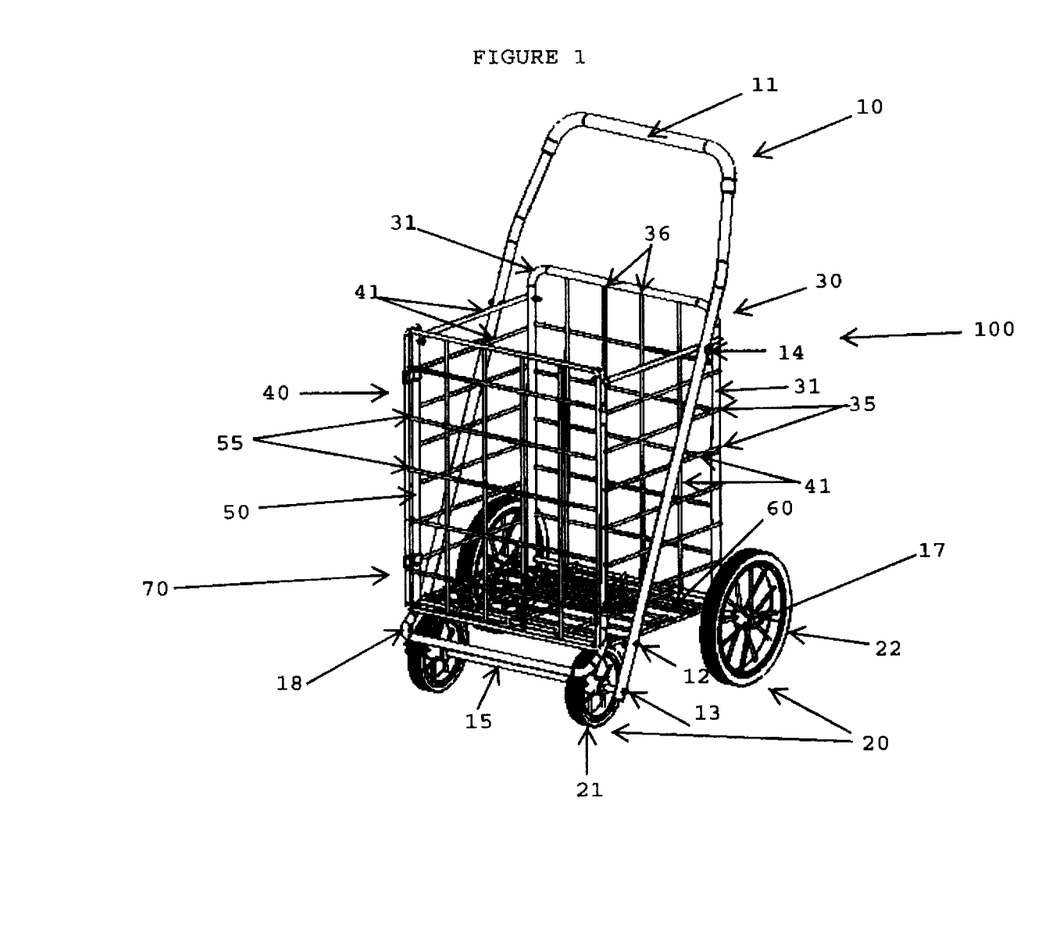
FIG. 1 is an illustration of one embodiment of the present invention.

FIG. 1 illustrates a view of one preferred embodiment of the present invention. The cart/dolly system 100 includes a main frame member 10, wheels 20, a back member 30, a back frame member 31, side members 40, a front frame member 50, bottom member 60 and a front door member 70. Main frame member 10 includes a handle section 11 that provides a location for users to exert force upon frame member 10 in order to move cart/dolly system 100. Frame member 10 preferably extends from handle section 11 and down and around the outside of side members 40 on both the right and left sides of cart/dolly system 100 with connection point 14 and eventually ending with connection points 12 and 13 as illustrated in FIG. 1. Connection points 12, 13, and 14 exist on both the right and left sides of cart/dolly system 100. The components of cart/dolly system 100 may be made of any number of various materials, such as metal, plastic, chrome, iron, stainless steel, aluminum, any combination thereof, and the like.

Connection point 14 of frame member 10 is a point of connection whereby frame member 10 is secured to a portion of side members 40 via some type of fastening mechanism, such as a screw, bolt, cotter pin, or other connection mechanism. Connection point 12 of frame member 10 is a point on frame member 10 whereby frame member 10 is secured to bottom member 60 via some type of fastening mechanism, such as a screw, bolt, cotter pin, or other connection mechanism. Connection point 12 also assists in providing support to bottom member 60 which increases the overall strength and durability of bottom member 60. Connection point 13 of frame member 10 is a point on frame member 10 whereby frame member 10 is secured to front wheel member 15 via some type of fastening mechanism, such as a screw, bolt, cotter pin, or other connection mechanism which in turn will secure front wheels 21 to cart/dolly system 100. As illustrated in FIG. 1A, front wheel member 15 is preferably an axle or rod member that assists in spacing front wheels 21 apart from one another, enables front wheels 21 to rotate freely and enables front wheel 21 to be mounted to frame member 10 via connection point 13.

In a preferred embodiment, frame member 10 is configured so that connection point 13 is located apart from connection point 12 as illustrated in FIG. 1. With this configuration, when front wheels 21 are secured to cart/dolly system 100 via front wheel member 15, front wheels 21 will be located underneath bottom member 60 so that the bottom of the cart/dolly system will be located sufficiently above a ground surface enabling the cart/dolly system to be easily maneuvered around or over obstacles or conditions which may exist on a ground surface, such as trash, water, and the like.

Figure 2:
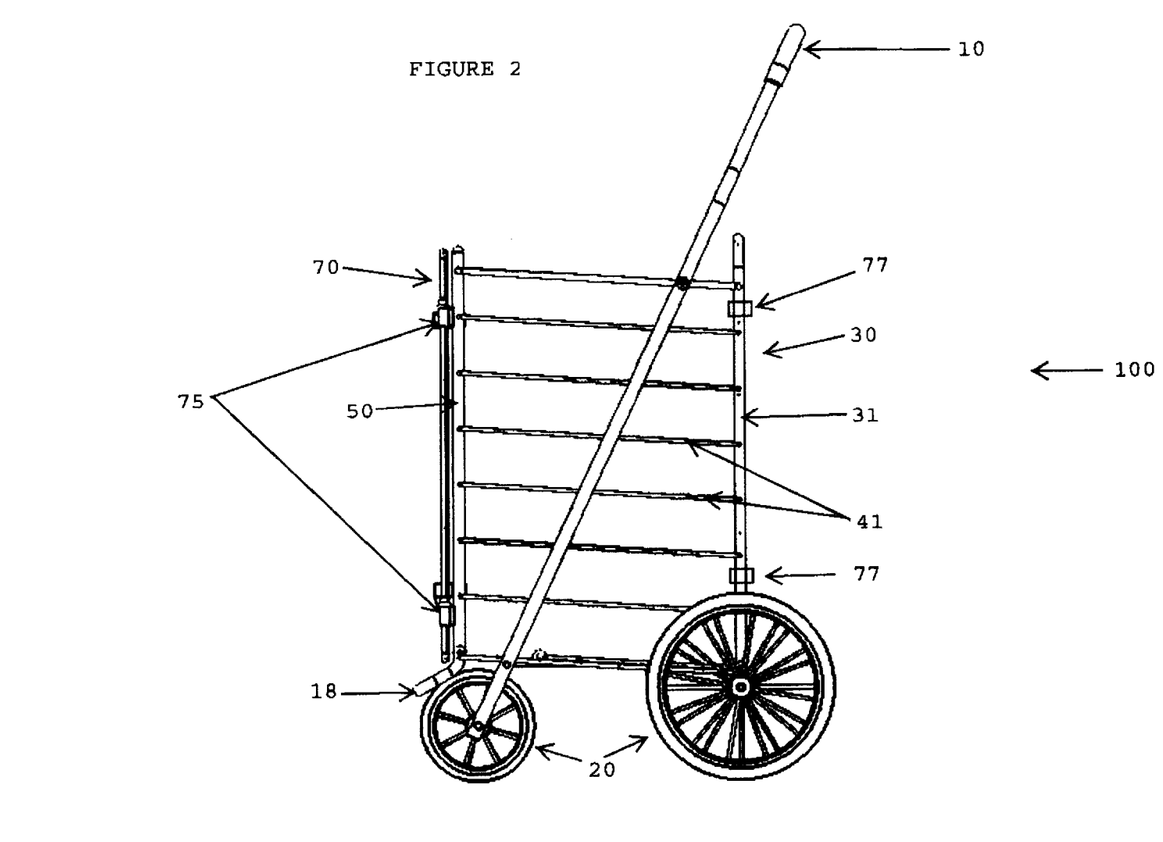
FIG. 2 is another illustration of the embodiment of FIG. 1 illustrating a side view.
Figure 3:
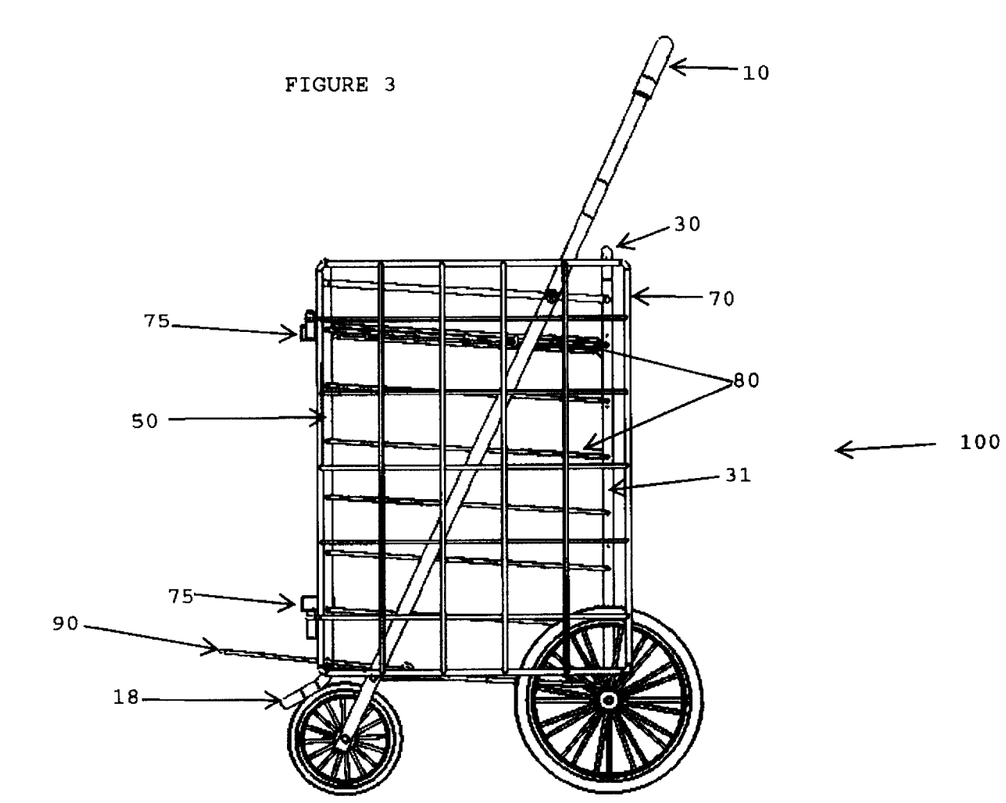
FIG. 3 is an alternative illustration of the embodiment of FIG. 1.
Figure 4:
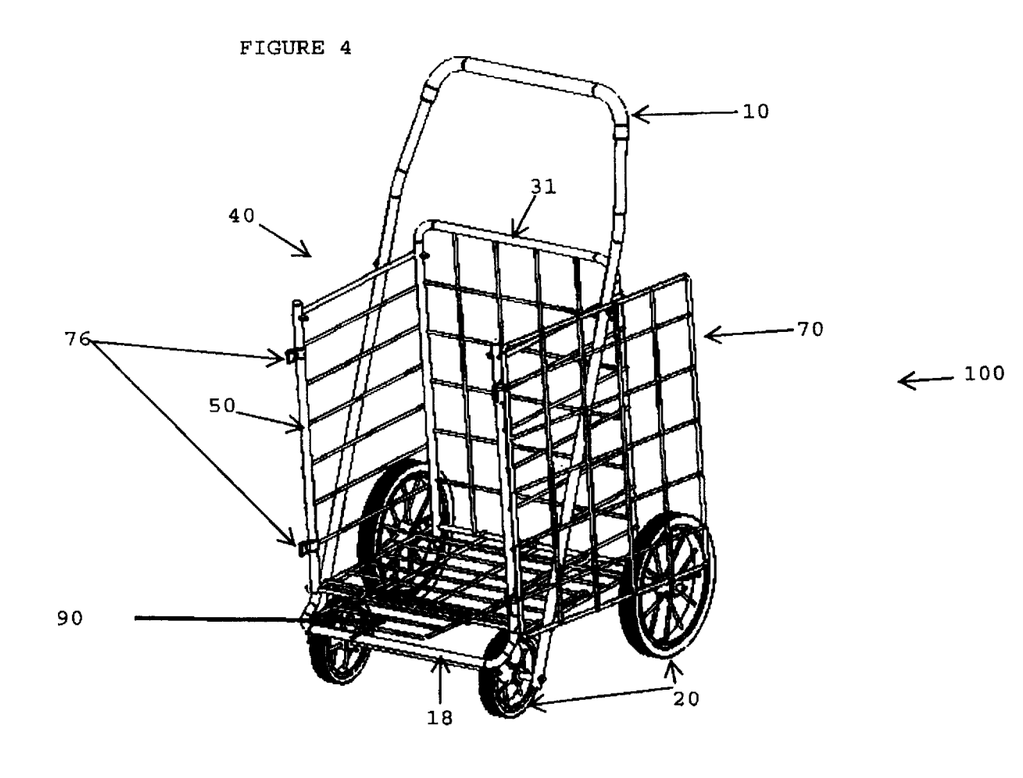
FIG. 4 is another illustration of the embodiment of FIG. 1 further illustrating an open door.
Figure 5:
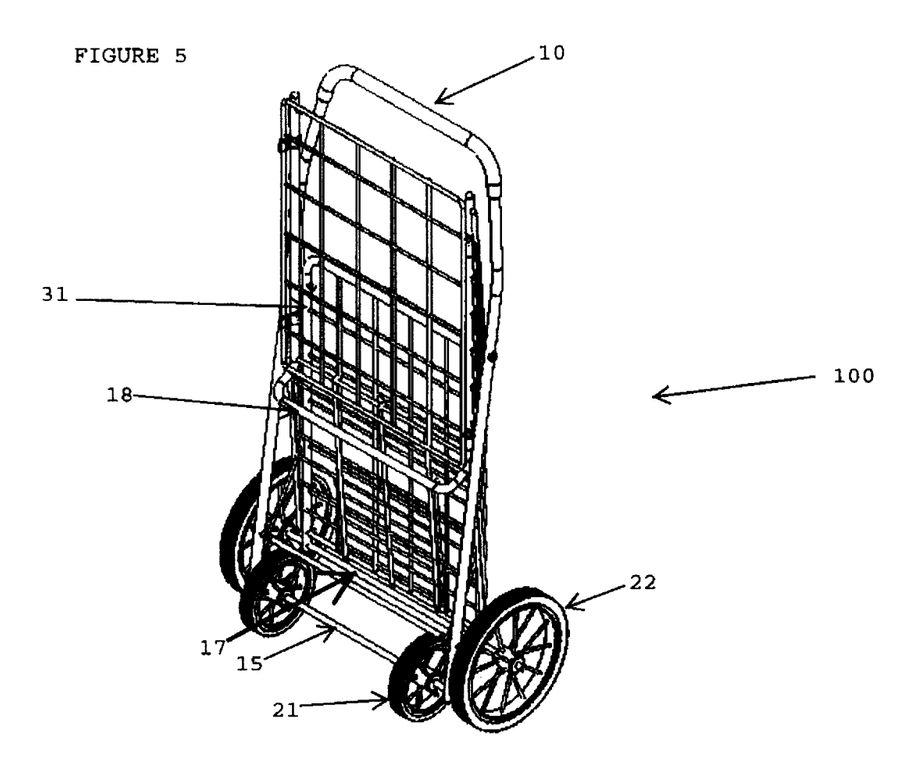
FIG. 5 is another illustration of the embodiment of FIG. 1 in a collapsed position.

Back member 30 is the back member of the cart/dolly system 100 that provides a back boundary for cart/dolly system 100. Part of back member 30 includes back frame member 31 as illustrated in FIGS. 1-4. Back frame member 31 may be configured in the shape of an upside down "U" whereby the top portion extends perpendicular to side members 40. Near side members 40, back frame member 31 will curve downward and run down toward back wheels 22 as illustrated in FIGS. 1 and 4. As illustrated in FIG. 5, back frame member 31 will extend down toward back wheels 22 and connect to back wheel member 17 via some type of connection, such as a hard permanent welded connection or by a fastening mechanism, such as a screw, bolt, cotter pin, or other connection mechanism which in turn will secure back wheels 22 to cart/dolly system 100. As illustrated in FIG. 1A, back wheel member 17 is preferably an axle or rod member that assists in spacing back wheels 22 apart from one another, enables back wheels 22 to rotate freely, and enables back wheels 22 to be connected to back frame member 31 via back wheel member 17.

Front frame member 50, as illustrated in FIGS. 1 and 4, is a frame member that is located in the front of cart/dolly system 100 and provides the framework for front door member 70 to be located in the front of cart/dolly system 100. In one embodiment of the present invention, front frame member 50 may be configured in the shape of "U" whereby front frame member 50 extends from a top side of one side member 40 down toward front wheels 21. At or near front wheels 21, front frame member 50 may extend/curve outward and around front wheels 21 creating an extension bar 18 as illustrated in FIGS. 1 to 4. Extension bar 18 will extend around front wheels 21 and parallel to front wheel member 15. Front frame member 50 may then curve back in and extend back up near the second side member 40 as illustrated in FIGS. 1 and 4. In one embodiment, extension bar 18 protrudes out in front of front wheels 21 and functions as a protector to front wheels 21. Extension bar 18 may act as a protector so that when cart/dolly system 100 is in use, extension bar 18 will come into contact with any foreign objects or obstacles before front wheels 21 will make contact with such foreign objects or obstacles.

Figure 3A:
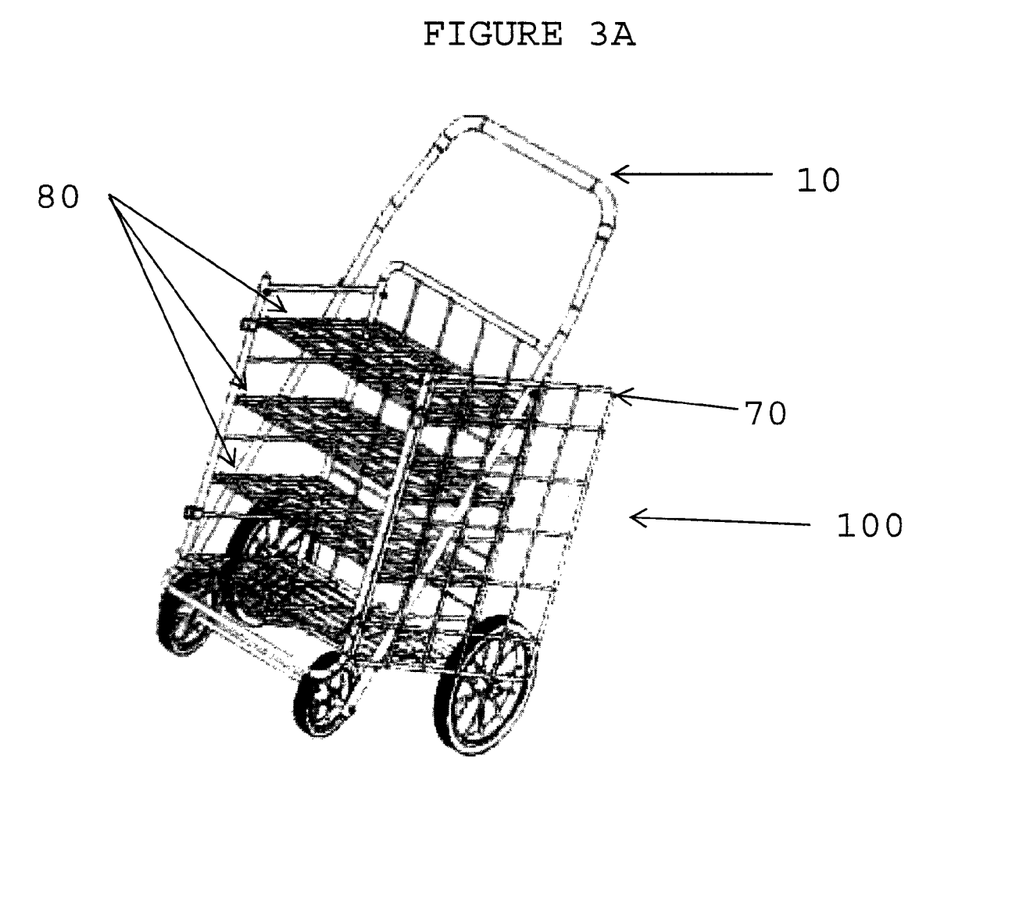
FIG. 3A is another view of the embodiment of FIG. 1.

Front door member 70 acts as a door in that it may be opened to fully expose the inside of cart/dolly system 100. Unlike other systems, front door member 70 provides an advantage to the present invention as it opens fully thereby exposing and providing users with access to the entire inside of cart/dolly system 100. As illustrated in FIG. 3A, the present invention may also include one or more shelves 80. As seen in FIGS. 3, 3A and 4, front door member 70 opens to the side so that door member 70 is almost parallel to side member 40. As shown in FIGS. 3A and 4, when door member 70 is fully open, a user is provided full access to the entire interior of the cart system and is thereby able to easily access any shelves 80 and a user is also able to easily access any items that may be located at various locations within cart/dolly system 100. As illustrated in FIGS. 2 and 3, front door member 70 may be mounted to front frame member 50 via some type of hinge/fastening mechanism illustrated by hinge member 75. Preferably, front door member 70 will attach to hinge member 75 and hinge member 75 will be connected/mounted to front frame member 50 thereby connecting front door member 70 to cart/dolly system 100. Hinge member 75 operates so that front door member 70 can rotate or move about hinge member 75 thereby allowing front door member 70 to open up and expose the inside of cart/dolly system 100.

As illustrated in FIG. 4, cart/dolly system 100 may also include securing mechanism 76 that will function to keep front door member 70 securely closed and fastened in a closed position. The present invention may include any number of securing mechanisms 76. For example, there may be two securing mechanisms 76 as illustrated in FIG. 4 that may be arranged with one at the top end of front door member 70 and another at the bottom of front door member 70. However, the present invention is not limited to such configuration as an embodiment may be configured with any number of securing mechanism(s) 76 located at varying positions. Securing mechanism 76 may be a fastener, a lock, a clamp, clip, or latch, such as a rotary latch, a compression latch, and the like that functions to secure front door member 70 in a closed position when front door member 70 is not open.

In alternative embodiments, cart/dolly system 100 may be configured so that when front door member 70 opens, it does not open to the outside of side member 40, but will open and then collapse or slide in the inside of cart/dolly system 100 so that front door member 70 is parallel to side member 40. This type of configuration will be advantageous in instances where a user will be moving oversized objects whereby front door member 70 has to remain in an open position while a user is transporting the oversized object. In addition, the particular configuration of front door member 70 may be such that a user selects whether to open front door member 70 to the outside of side member 40 or to collapse front door member 70 to the inside of side member 40.

The ability of front door member 70 to open up and expose the interior of cart/dolly system 100 is advantageous as it allows users to easily access the entire interior of cart/dolly system 100. Thus, users are now able to simply open front door member 70 to reach objects placed within cart/dolly system 100 without having to reach over the top of side members 40 or back frame member 31. With front door member 70 open and the interior of the cart/dolly easily accessible, a user can easily stack items on bottom member 60 without having to bend over the sides of the cart/dolly and users can easily retrieve any such items located on the bottom of the cart/dolly by simply opening door member 70. Door member 70 also adds to the safety of use of cart/dolly system 100 as users will no longer have to strain while bending over side members 40 and/or back frame member 31 to reach for items that may be located at the bottom of the cart/dolly system 100.

While FIG. 4 illustrates front door member 70 opening to the right, the present invention is not limited to such a configuration as cart/dolly system 100 may be configured so that front door member 70 opens to the left. In an alternative embodiment, cart/dolly system may be configured so that a user can configure front door member 70 to open to either the right or left side depending on a user's preference.

Side members 40, as illustrated in FIGS. 1 and 4, function to provide side boundaries for cart/dolly system 100. In one embodiment of the present invention, side members 40 may be comprised of individual bars/members 41 that extend perpendicular to and between back frame member 31 and front frame member 50. In a preferred embodiment, individual bars/members 41 will connect to back frame member 31 and front frame member 50 at various connection points 35 and 55 as illustrated in FIG. 1. Connection points 35 are various points located in back frame member 31 and connection points 55 are various points located in front frame member 50 that provide a connection/mounting location for individual bars/members 41. In a preferred embodiment of the present invention, one end of an individual bar/member 41 will connect to a connection point 35 in back frame member 31 and the opposite end of the same individual bar/member 41 will connect to a connection point 55 in front frame member 50.

In one embodiment of the present invention, back member 30, similar to side members 40, may also comprise a number of individual bars/members 41 that run both parallel to and perpendicular to back frame member 31 that will be fixated to back frame member 31 via connection points 35 and connection points 36 that are located throughout back frame member 31 as illustrated in FIG. 1. With individual bars/members 41 connected to back frame member 31 via connection points 35 and 36, a back boundary is created that will help prevent objects placed within cart/dolly system 100 from falling out of the cart/dolly system 100. In an embodiment of the present invention, individual bars/members 41 in conjunction with connection points 35, 36, and 55 may be arranged in any number of configurations to create a cage like configuration whereby the gaps between adjacent bars/members 41 may be large or small. In some embodiments, back frame member 31 and front frame member 50 may be configured so that the location of connection points 35, 36, and 55 are adjustable so that a user may create cage like side and back boundaries whereby the spacing between adjacent bars/members 41 may be large, medium, or small depending on a user's preference. For instance, if a user were transporting a smaller item, the user may want the spacing between the adjacent bars/members 41 to be small so that the smaller item in the cart/dolly system 100 does not fall out of the cart.

In one embodiment, cart/dolly system 100 may also include an extension member 90 as illustrated in FIGS. 3 and 4. Extension member 90 may be attached to bottom member 60 such that extension member 90 may be moved or rotated up and back such that it rests upon bottom member 60 and does not extend outward. For example, in an extended position, extension member 90 will extend out past extension bar 18 as illustrated in FIG. 3; and in a non-extended or "putaway" position extension member 90 may rest upon bottom member 60 as if it were a part of bottom member 60.

Extension member 90 functions to assist users in moving oversized, large, obscure, and/or heavy objects. In moving such objects, it is difficult for users to pick up said objects and place them in dolly/cart system 100 for movement. With extension member 90, a user can position cart/dolly system 100 near the object to be moved and position extension member 90 near the object and place the object on top of extension member 90 or place extension member 90 underneath the object. Then, after the object to be moved is placed on extension member 90 or after extension member 90 is placed under the object, a user may tilt cart/dolly system 100 in a backward direction and then use the cart/dolly system 100 to move the object rather than straining or injuring themselves while trying to move the object Extension member 90 also allows a user to move objects that are larger than the depth of dolly/cart system 100 as portions of an object that would extend past the dolly/cart can rest upon extension member 90 such that the restraints normally imposed by the depth of dolly/cart system 100 are removed with extension member 90.

In one embodiment, extension member 90 may be a planar sheet member that may be a solid piece of material or it may be made up of a plurality of individual members similar to individual bars/members 41 of side member 40. Extension member 90 may be made of any number of materials, such as metal, plastic, steel, stainless steel, wood, chrome, aluminum, iron, and the like. Extension member 90 functions as a bottom plate and holding member in which objects to be moved by the present invention are placed upon and sit on extension member 90 and/or sit upon extension member 90 and bottom member 60 so that an object placed on extension member 90 may sit on extension member 90 and may then be moved with the present invention.

Extension member 90 may take the form of any number of shapes, such as circular, triangular, trapezoidal, rectangular, square shaped, and the like. In one embodiment, extension member 90 may be a solid planar member or it may be configured with a plurality of holes to provide for drainage of any number of substances, such as liquids, dirt, and the like that may fall upon extension member 90 from any number of object(s) being moved with dolly/cart system 100 with the assistance of extension member 90. For example, if the present embodiment is in use moving a large bag of ice or multiple bags of ice or outdoor gardening materials whereby melted ice, water, or dirt or other debris from the gardening materials spill out onto extension member 90, a plurality of holes in extension member 90 may provide for drainage of the debris off of extension member 90 and away from dolly/cart system 100.

In one embodiment, extension member 90 may be configured so that a plurality of wheels, rollers, and/or spherical balls are mounted to and/or in extension member 90 whereby the plurality of wheels, rollers, and/or spherical balls assist in loading objects onto extension member 90. For example, the plurality of wheels, rollers, and/or spherical balls may be sized and placed in a section of extension member 90 so that as an object is being loaded, any portion of the object can be placed on any portion of the plurality of wheels, rollers, and/or spherical balls in extension member 90 so that the object may be pushed and rolled onto extension member 90 by being pushed on and/or over any of the plurality of wheels, rollers, and/or the spherical balls thereby reducing the amount of energy and force needed to load an object onto extension member 90. In a preferred embodiment, any wheels and/or rollers in extension member 90 may be configured so that the wheels and/or rollers will also help to unload any objects that have been placed upon extension member bar 90. In another embodiment, the rollers and/or wheels of extension member 90 may be configured so that when the present invention is being used to move an object, the wheels and/or rollers in extension member 90 may be locked to prevent objects from moving while the object is on extension member 90 thereby preventing the possibility of any objects rolling and/or moving off of extension member 90 while dolly/cart system 100 is in use transporting objects resting on extension member 90.

Extension member 90 may be configured in any number of sizes. To accommodate movement of smaller objects, extension member 90 may be sized accordingly to accommodate movement of such smaller objects. In other embodiments of the present invention, extension member 90 may be large to accommodate movement of larger objects. In an embodiment where extension member 90 is wide, the remaining components of the present invention may also be sized accordingly to line up with the size of extension member 90. However, the present embodiment is not limited to this configuration. For example, back member 30, back frame member 31, and front frame member 50 may be larger in embodiments that have a wide extension member 90 as the width of extension member 90 may be constrained by the size of back member 30, back frame member 31, and front frame member 50. In embodiments with a narrow extension member 90, back member 30, back frame member 31, and front frame member 50 may be smaller to account for the narrowness of extension member 90. In other embodiments, the present invention may be configured so that the size of extension member 90 is adjustable. For example, the present invention may be configured so that extension member 90 may expand into a larger extension member 90 or collapse into a smaller extension member 90 to account for the size of the object to be moved with the present invention. The adjustability discussed above is not limited to extension member 90, as the present invention may be configured so that any of the members comprising dolly/cart system 100 are adjustable and may be adjusted to account for the size and layout of the object to be moved on dolly/cart system 100.

While FIGS. 3 and 4 illustrate extension member 90 as only extending outward, the present invention is not limited to this configuration. In alternative embodiments, extension member 90 may be configured so that it extends outward and also extends downward below extension bar 18 toward the ground surface to further assist users is loading objects upon extension member 90. In some embodiments, extension member may be comprised of more than one member whereby one part of extension member 90 will extend outward as illustrated in FIGS. 3 and 4, and a second part of extension member 90 will extend down toward the ground surface. In other embodiments, extension member 90 may be configured so that when it is extended out from bottom member 60, extension member 90 will extend down all the way toward the ground surface.

In an alternative embodiment, cart/dolly system 100 may be configured so that front wheels 21 may be easily removed so that when a user is moving a large object with the assistance of extension member 90, the user can remove front wheels 21 and then lean dolly/cart system 100 forward toward the ground so that a user can easily load an object upon extension member 90. With front wheels 21 removed, a user is able to lean cart/dolly system 100 closer to the ground without any interference from front wheels 21.

In another embodiment, frame member 10 may be configured, so that instead of removing front wheels 21, frame member 10 will be partially collapsible in that a user can grab the bottom of frame member 10 and push frame member 10 upward so that front wheels are above the ground surface thereby enabling a user to easily lower bottom member 60 to the ground surface with no interference from front wheels 21.

The present invention may also be configured as illustrated in FIG. 2 with a set of holding devices 77, such as clamps, hooks, and the like that may be connected to back frame member 31, individual bars/members 41, or both that may function to hold front door member 70 in an open position when a user chooses to move objects with front door member 70 in an open position. For example, if a user were to utilize the present invention to move an oversized object such that front door member 70 has to remain in an open door position, then a user can open front door member 70, then secure front door member 70 in the open position with holding devices 77 and then proceed to utilize cart/dolly system 100 with front door member 70 in the open position.

In other embodiments, the present invention may be configured to include one or more shelves 80, as illustrated in FIG. 3 and FIG. 3A. As illustrated in FIG. 3A, shelves 80 may be stacked or mounted at different locations within cart/dolly system 100 giving users the ability to separate items at different locations within cart/dolly system 100. For example, if a user where to use cart/dolly system to move groceries, a user can place heavier items, such as can goods on one shelf 80 and place other items, such as bread or fruit on another shelf 80, in order to prevent heavier items from damaging the lighter items, such as bread and fruits/vegetables.

In one embodiment, shelves 80 may be configured to simply snap on or hook on to the individual bars/members 41 of side members 40 so that shelves 80 may be located in any number of configurations with varying amounts of space between shelves 80 depending on a user's preference. In some embodiments, shelves 80 may be solid planar members or may be configured as cage like members with holes in the shelves. Shelves 80 may also take the form of any number of shapes, such as circular, triangular, trapezoidal, rectangular, square shaped and the like. In addition, shelves 80 may be made of any number of materials, such as metal, plastic, chrome, iron, stainless steel, aluminum, any combination thereof, and the like. Shelves 80 may be permanently mounted within cart/dolly system 100 or the shelves 80 may be configured so that a user can install the shelves 80 at his/her discretion. In some embodiments, shelves 80 may be configured so that when shelves 80 are not in use, the shelves may collapse or fold down onto side members 40, back member 30, front door member 70 or any combination thereof.

In an alternative embodiment, cart/dolly system 100 may be configured so that one or more of shelves 80 can be mounted to bottom member 60 and function as extension member 90. As illustrated in FIG. 3, shelves 80 may be mounted on a slight decline toward back member 30 so that items place upon shelves 80 will have a tendency to lean away from front door member 70 in order to reduce the possibility of items falling out of cart/dolly system 100 when in use.

Figure 4B:
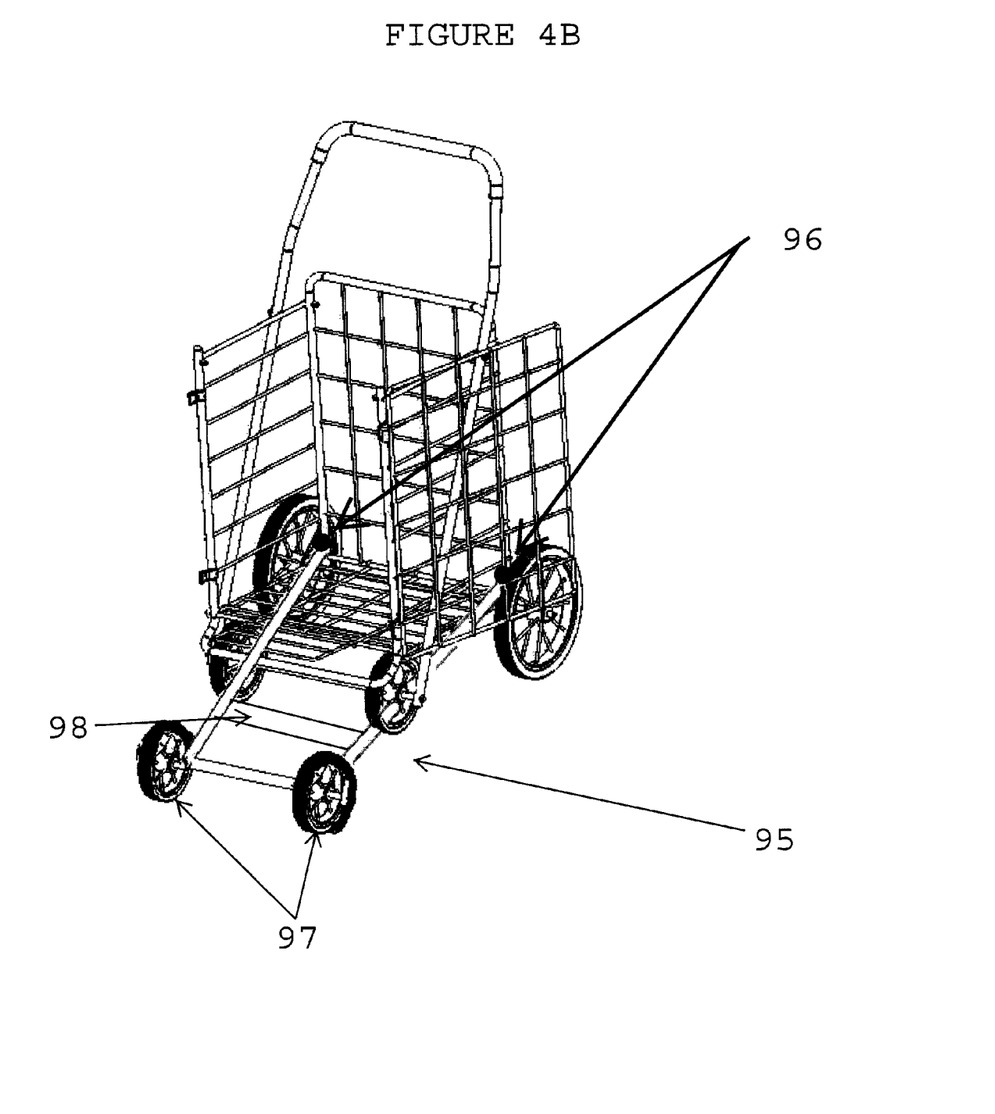
FIG. 4B is an illustration of an embodiment of the present invention configured as an elongated a hand cart.

In one embodiment, the present invention may be configured so that cart/dolly system 100 also includes elongated cart member 95 as illustrated in FIG. 4B. Elongated cart member 95 allows cart/dolly system 100 to be used as a full size hand cart that enables a user to move items that would not fit within the confines of cart/dolly system 100, but require additional space. As shown in FIG. 4B, elongated cart member 95 is a member that may attach to the back of cart/dolly system 100 at back frame member 31 at connection points 96. Connection points 96 are points of connection whereby elongated cart member 95 is secured to back frame member 31 via some type of fastening mechanism, such as a screw, bolt, cotter pin, or other connection mechanism. Elongated cart member 95 also includes wheels 97 located on the front of elongated cart member 95 as illustrated in FIG. 4B. Thus, in one embodiment, elongated cart member 95 may attach to back frame member on both the right and left sides as illustrated by connection points 96. Elongated cart member 95 is also configured with wheels 97 that supports elongated cart member 95 and enables the cart/dolly system to be used as a full size hand cart. Wheels 97 may be any different type of wheels such as a wheel configured with an axle member or they may consist of casters that mount to elongated cart member 95. An embodiment may also be configured so that elongated cart member 95 also includes side support cross member 98 that extends from one end of elongated cart member to the other end that functions to add support to elongated cart member 95 and also provides a resting place for objects to sit upon while in movement. While elongated cart member 95 is only illustrated in FIG. 4B with one cross member 98 and with only two wheels 97, alternative embodiments may be configured with multiple wheels and multiple cross members.

In one embodiment elongated cart member may be adjustable so that a user may extend elongated cart member 95 out to any number of different lengths depending upon the object to be moved. In a preferred embodiment, elongated cart member 95 is configured so that it can collapse down and be stored under bottom member 60. In other embodiments, elongated cart member 95 may be a separate member that may be stored and attached to back member 30 until elongated cart member 95 is needed.

FIG. 5 illustrates an embodiment of the present invention in a collapsible state. In the collapsible state, front wheels 21 will move back toward back wheels 22 and front door member 70 will move up and back toward back member 30 so that the cart/dolly system 100 is in a collapsible state. Individual bars/members 41 of side members 40 may either disconnect from connection points 35 and 55 and simply hang down or may move so that front frame member 50 can be moved back up against back frame member 31 so that cart/dolly system 100 is in a collapsed state. In a collapsed state, cart/dolly system 100 takes up less space such that it is easy for a user to store when not in use.

Figure 6:
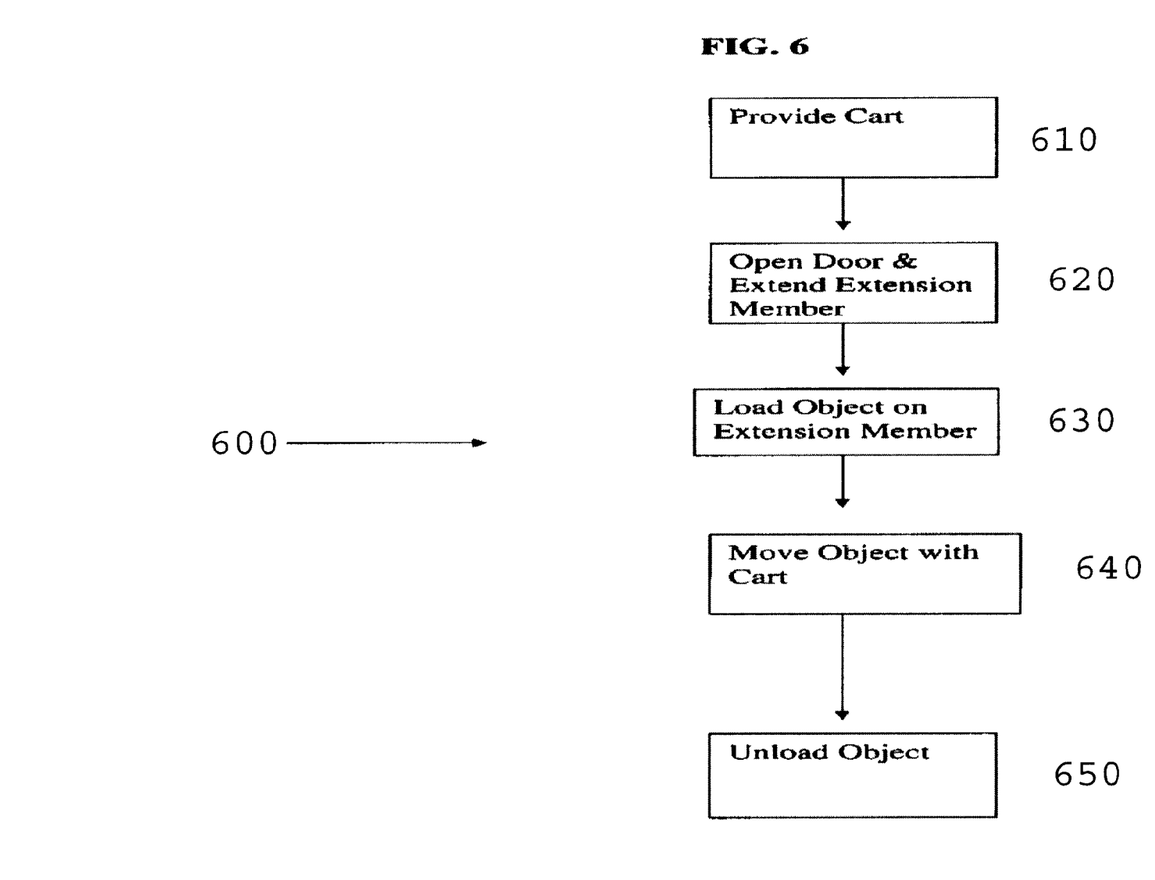
FIG. 6 illustrates a flowchart representing one method for transporting objects according to one embodiment of the present invention.

FIG. 6 illustrates a flowchart representing one method for moving objects according to one embodiment of the present invention. Flow 600 represents a method for moving objects. In block 610, a cart/dolly system 100, as illustrated in FIGS. 1-4 is provided. After the cart/dolly system 100 is provided, flow 600 proceeds to block 620, where front door member 70 is opened and extension member 90 is extended outward. After front door member 70 is opened and extension member 90 is extended, flow 600 proceeds to block 630 whereby an object to be moved with cart/dolly system 100 is loaded on cart/dolly system 100. For example, the object may be a piece of furniture, or an oversized object that will not fit within the boundaries of cart/dolly system 100 if front door member 70 is closed.

In loading an object, a user may position extension member 90 underneath the object or move the object on top of extension member 90, bottom member 60, or position the object so that a portion of the object is on extension member 90 and a portion of the object is on bottom member 60. After the object is loaded onto extension member 90 and bottom member 60, flow 600 proceeds to block 640. In block 640, cart/dolly system 100 and the object to be moved, which is located on extension member 90 and/or on bottom member 60, is then moved with a user asserting a force upon handle section 11 of frame member 10 so that wheels 20 will begin to move. The cart/dolly system 100 and the object to be moved may be moved to its final location where it may then be moved off of cart/dolly system 100.

After block 640, flow 600 proceeds to block 650. When flow 600 proceeds to block 650, the object is unloaded. In unloading an object from cart/dolly system 100, a user may then slide the object off of extension member 90 and/or off of bottom member 60 by sliding the object without having to perform any heavy lifting of the object. Thus, the present invention may be used to move objects without requiring any heavy lifting of the objects to be moved.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A cart system for moving objects comprising:
   a main frame member wherein said main frame member comprises:
   a handle section for allowing users to apply force to said main frame member to result in movement of said system;
   side members;
   a back member comprising a back frame member that provides a back boundary for said system;
   a front frame member;
   a bottom member;
   a front door member;
   a set of front wheels;
   a set of rear wheels, wherein said main frame member extends out and down to the right and left side of said handle section and extends down to the right and left outside of said side members and connects to said side members with at least one side member connection point, and further extends down to said bottom member and connects to said bottom member with at least one bottom member connection point, and further extends down past said bottom member to said set of front wheels;

an elongated member wherein said elongated member comprises at least a front member, a right extension member and a left extension member wherein said right extension member and said left extension member extend out away from and perpendicularly from said back member and parallel to said bottom member towards said set of front wheels wherein said elongated member is adjustably connected to said back frame member via elongated member connection points wherein said front member of said elongated member runs perpendicular between said right extension member and said left extension member and connects to said right extension member and said left extension member;

a plurality of wheels connected to the underside of said elongated member wherein said wheels support said elongated member; and at least one support member wherein one end of said support member is connected to said right extension member and extends out perpendicularly away from said right extension member to said left extension member and is connected to said left extension member wherein said support member provides a resting place for objects placed upon said elongated member.

2. The cart system of claim 1 wherein:

said set of front wheels are connected to a first rod member with one wheel connected to each side of said first rod member wherein said first rod member enables said front wheels to rotate freely; and said first rod member extends out past said front wheels and connects to said main frame member via a front wheel connection point that acts to hold said main frame member to said first rod member wherein said front wheels are located under said bottom member so that said bottom member is located above the ground surface so that said system may be easily moved over said ground surface.

3. The cart system of claim 2 wherein:

said set of rear wheels are connected to a second rod member with one rear wheel connected to each side of said second rod member wherein said second rod member enables said rear wheels to rotate freely;

said back frame member extends out to the left and the right perpendicular to said side members to an end point and then curves downward toward said rear wheels and connects to said second rod member to secure said rear wheels to said cart system; and said second rod member extends out past said back frame member to position said rear wheels outside of said side members.

4. The cart system of claim 3 wherein said front frame member is a "U" shaped member wherein one side of said front frame extends down along one side member toward said front wheels and near said front wheels, said front frame member extends outward and around said front wheels creating an extension member, and then said front frame member extends up along the other side member.

5. The cart system of claim 4 wherein said extension member extends out in front of said front wheels and functions as a protective member to protect said front wheels.

6. The cart system of claim 4 wherein said front frame member further comprises front door hinge members whereby said front door member will connect to said front flame member via said front door hinge members wherein said front door hinge members also enable said front door member to open and close.

7. The cart system of claim 6 wherein said front frame member further comprises at least one securing mechanism for holding said front door member in a closed position.

8. The cart system of claim 4 wherein said front door member opens and collapses and may be stored parallel to said side member.

9. The cart system of claim 8 wherein said back frame member comprises a plurality of back frame bar members wherein some of said back frame bar members run perpendicular to said back frame member and some of said back frame bar members run parallel to said back frame member whereby said back frame bar members connect to said back frame member via back frame bar member connection points.

10. The cart system of claim 4 wherein said side members comprise a plurality of side bar members that extend perpendicular to and between said back frame member and said front frame member whereby said side bar members connect to said back frame member and said front frame member via bar member connection points.

11. The cart system of claim 10 wherein the location of said side bar members and the point of connection via said bar member connection points are adjustable.

12. The cart system of claim 11 further comprising:
one or more shelves.

13. The cart system of claim 12 wherein said shelves are adjustably mounted to said side bar members wherein said shelves may be mounted at different locations.

14. The cart system of claim 12 further comprising:
a second extension member adjustably connected to said bottom member wherein said second extension member may be rotated away from said bottom member to extend out past said front frame member and extend the area of said cart system.

15. The cart system of claim 14 wherein said cart system may collapse thereby reducing the overall area of the cart.

16. A method for moving objects comprising:
providing a cart system for moving objects wherein said cart system comprises:
a main frame member wherein said main frame member comprises:
a handle section for allowing users to apply force to said main frame member to result in movement of said system;
side members;
a back member comprising a back frame member that provides a back boundary for said system;
a front frame member;
a bottom member;
a front door member;
a set of front wheels; and
a set of rear wheels, wherein said main frame member extends out and down to the right and left side of said handle section and extends down to the right and left outside of said side members and connects to said side members with at least one side member connection point, and further extends down to said bottom member and connects to said bottom member with at least one bottom member connection point, and further extends down past said bottom member to said set of front wheels;
an elongated member wherein said elongated member comprises at least a front member, a right extension member and a left extension member wherein said right extension member and said left extension member extend out away from and perpendicularly from said back member and parallel to said bottom member towards said set of front wheels wherein said elongated member is adjustably connected to said back frame member via elongated member connection points wherein said front member of said elongated member runs perpendicular between said fight extension member and said left extension member and connects to said right extension member and said left extension member;

a plurality of wheels connected to the underside of said elongated member wherein said wheels support said elongated member; and at least one support member wherein one end of said support member is connected to said fight extension member and extends out perpendicularly away from said fight extension member to said left extension member and is connected to said left extension member wherein said support member provides a resting place for objects placed upon said elongated member;

positioning an object on said bottom member;

applying force to said cart system; and moving said cart system for moving objects.

17. The method of claim 16, wherein the cart system further comprises:

one or more shelves;

an extension member adjustably connected to said bottom member wherein said extension member may be rotate away from said bottom member to extend out past said front frame member and extend the area of said cart system;

an elongated member wherein said elongated member is adjustably connected to said back frame member via elongated member connection points;

a plurality of wheels connected to the underside of said elongated member; and at least one support member that extends from one side of said elongated member to an opposite side of said elongated member wherein said support member provides a resting place for objects placed upon said elongated member; and wherein said set of from wheels are connected to a first rod member with one wheel connected to each side of said first rod member wherein said first rod member enables said from wheels to rotate freely;

said first rod member extends out past said from wheels and connects to said main flame member via a front wheel connection point that acts to hold said main frame member to said first rod member wherein said from wheels are located under said bottom member so that said bottom member is located above the ground surface so that said system may be easily moved over said ground surface;

said set of rear wheels are connected to a second rod member with one rear wheel connected to each side of said second rod member wherein said second rod member enables said rear wheels to rotate freely;

said back frame member extends out to the left and the right perpendicular to said side members to an end point and then curves downward toward said rear wheels and connects to said second rod member to secure said rear wheels to said cart system; and said second rod member extends out past said back frame member to position said rear wheels outside of said side members.

18. The method of claim 17 wherein said step of applying force to said system comprises:

applying a force to said handle section to position said elongated member under an object to be moved so that said object may be positioned in said cart system and elevated above a ground surface so that said cart system may move said object.

\* \* \* \* \*